US007839413B2

(12) United States Patent
Liao

(10) Patent No.: US 7,839,413 B2
(45) Date of Patent: Nov. 23, 2010

(54) DITHERING METHOD FOR AN LCD

(75) Inventor: Huan-Sen Liao, Sinshih Township, Tainan County (TW)

(73) Assignee: Himax Technologies Limited (TW)

( * ) Notice: Subject to any disclaimer, the term of this patent is extended or adjusted under 35 U.S.C. 154(b) by 663 days.

(21) Appl. No.: 11/855,932

(22) Filed: Sep. 14, 2007

(65) Prior Publication Data

US 2009/0073185 A1 Mar. 19, 2009

(51) Int. Cl.

| | |
|---|---|
| ***G09G 3/36*** | (2006.01) |
| ***G09G 5/02*** | (2006.01) |
| ***G02F 1/133*** | (2006.01) |
| ***G06K 9/40*** | (2006.01) |
| ***G06K 9/32*** | (2006.01) |
| ***H04N 7/26*** | (2006.01) |
| ***H04N 7/36*** | (2006.01) |

(52) U.S. Cl. ........................ 345/581; 345/690; 345/55; 345/89; 348/254; 348/430; 348/671; 348/761; 358/1.9; 382/169; 382/170; 382/254; 382/274

(58) Field of Classification Search ................. 345/581, 345/589, 596, 204, 690–691, 694, 54–55, 345/63, 87–89; 348/251–254, 430, 536, 348/615, 671, 761; 358/1.9, 3.03, 3.13, 519, 358/532; 382/164–165, 237, 254, 274, 276, 382/169–170

See application file for complete search history.

(56) References Cited

U.S. PATENT DOCUMENTS

2004/0081079 A1* 4/2004 Forest et al. ................ 370/216
2005/0184938 A1* 8/2005 Hewlett et al. ................ 345/84
2008/0298438 A1* 12/2008 Song .......................... 375/145

* cited by examiner

*Primary Examiner*—Wesner Sajous
(74) *Attorney, Agent, or Firm*—Hayes Soloway P.C.

(57) ABSTRACT

A dithering method for an LCD is disclosed and comprises a plurality of steps. First, a plurality of long-bit gray-level signals are received. Each of the long-bit gray-level signal is transformed to a short-bit gray-level signal and at least one LSB is obtained based on the bit length difference between the long-bit gray-level signal and the short-bit gray-level signal. A sequence of frames is generated by the short-bit gray-level signals, and the frames can be classified into different groups according to the LSB. The offset pattern is applied on the frames, wherein the offset pattern is displayed at the same polarity in the same column of each frame in the same group.

11 Claims, 3 Drawing Sheets

DITHERING METHOD FOR AN LCD

BACKGROUND

1. Field of Invention

The present invention relates to a method for controlling the color of an LCD. More particularly, the present invention relates to a method for controlling the color of an LCD to improve dithering control in LCD devices.

2. Description of Related Art

Display hardware, including early computer video adapters and many modern LCDs used in mobile phones and inexpensive digital cameras, are only capable of showing a smaller color range than more advanced displays. One common application of dithering is to more accurately display graphics containing a greater range of color than the hardware is capable of showing.

The common dithering algorithm uses the spatial and temporal dithering to reduce the physical (hardware) cost and power consumption of LCDs. However, the scroll noise and flicker occurring on the LCD panel will sometimes occur while the dithering function is being executed, for example, the dithering function in the line inversion control mode.

Please refer to FIG. 1. FIG. 1 depicts a common 2-bit dithering algorithm in a 6-bit DAC to process 8-bit gray-level signal at line inversion control mode. When the input gray-level signal is 8-bit and the DAC is 6-bit, the 2-bit LSB (least significant bit) of the 8-bit gray-level signal is processed by the dithering algorithm. The 2-bit dithering algorithm generates four by four frames as a unit in spatial dithering and generates four frames as a unit in temporal dithering.

In addition, the polarity of each row on a frame is alternatively different and the polarity of each row is inverted at the next frame. Unfortunately, the variable polarity voltage of each controlled by VCOM may be vulnerable to error. Therefore, the brightness of point A and B are different. Moreover, the polarity of each row changes frame by frame. Hence, scroll noise and flicker occurs.

For instance, when XY (2-bit LSB) is 01, at frame N, column M, the offset pattern is at a negative polarity pixel. In addition, at frame N+1, column M, the offset pattern is at positive polarity pixel. However, the negative polarity voltage and the positive polarity voltage controlled by VCOM may not be symmetrical so that the brightness of the offset at column M is not identical in frame N and frame N+1. Hence, scroll noise and flicker occur in spatial and temporal dithering.

Therefore, it is desirable to improve the dithering algorithm to reduce the scroll noise and flicker in the LCD panel.

SUMMARY

According to one embodiment of the present invention, a dithering method for an LCD is disclosed. The steps of the method include receiving a plurality of long-bit gray-level signals, each of the long-bit gray-level signals is transformed into a short-bit gray-level signal, and at least one LSB is obtained based on the bit length difference between the long-bit gray-level signal and the short-bit gray-level signal. In sequence, a sequence of frames is generated by the short-bit gray-level signals, and the frames can be classified into different groups according to the LSB. Then, the offset pattern is applied on the frames, wherein the offset pattern is displayed at the same polarity in the same column of each frame in the same group.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
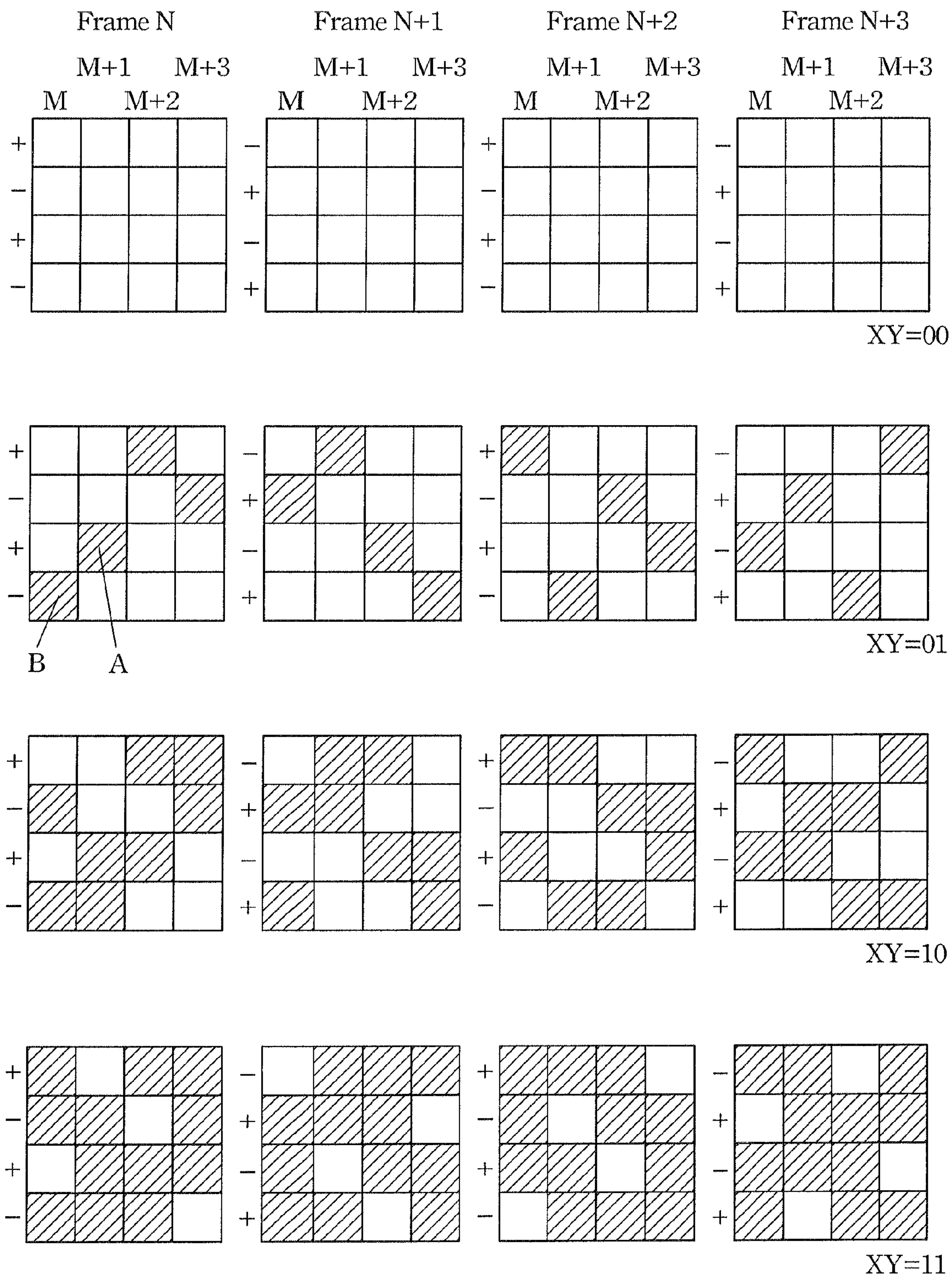
Fig. 1 (PRIOR ART)
FIG. 1 depicts common 2-bit dithering algorithm.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
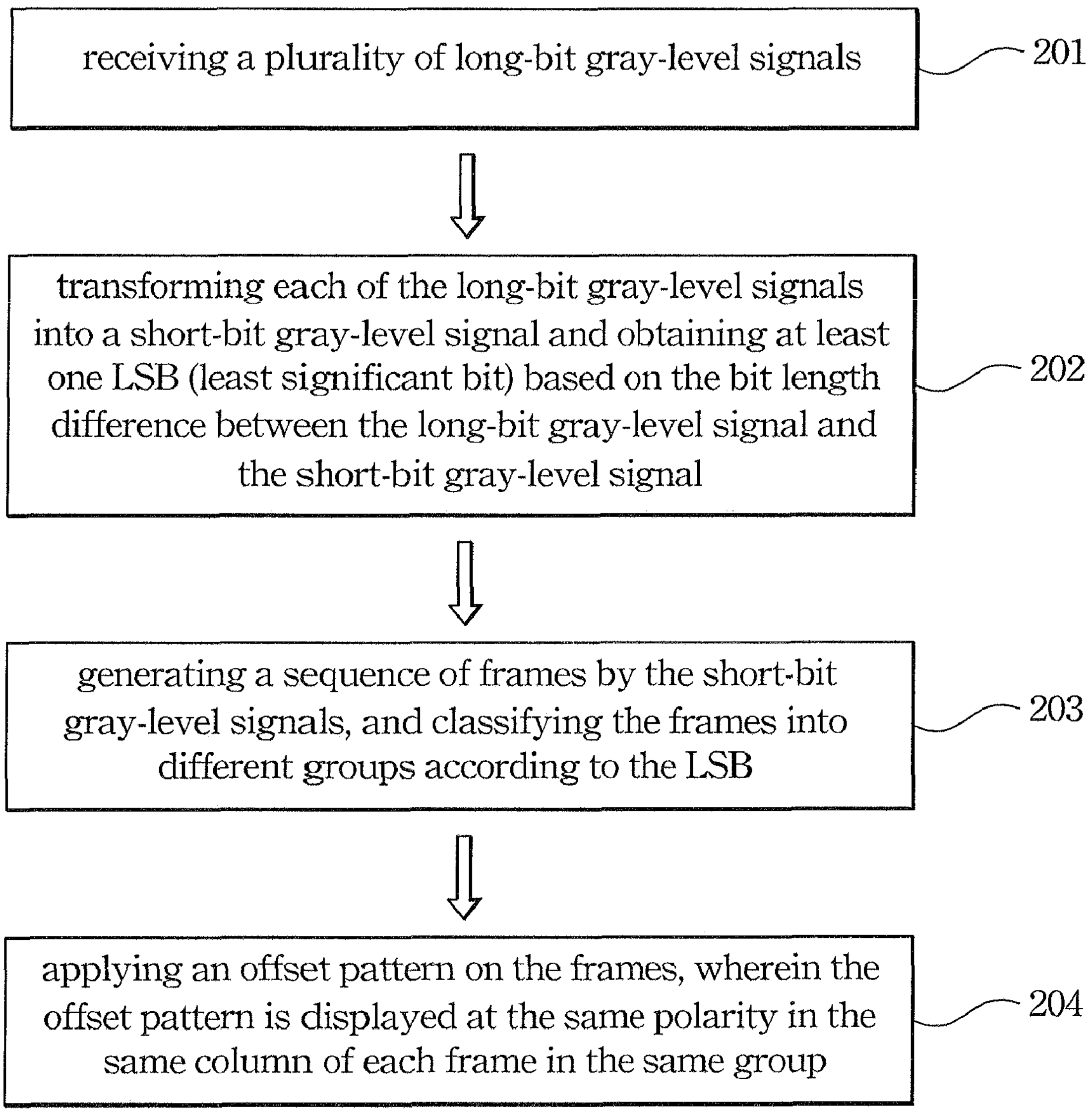
FIG. 2A illustrates a flow chart of a dithering method for displaying an image on an LCD.

FIG. 2A illustrates a flow chart of a dithering method for displaying an image on an LCD. According to one embodiment of the invention, in step 201, a plurality of long-bit gray-level signals are received. In sequence, in step 202, each of the long-bit gray-level signals is transformed to a shot-bit gray-level signal, and at least one LSB is obtained based on the bit length difference between the long-bit gray-level signal and the short-bit gray-level signal. Then, in step 203, a sequence of frames by the short-bit gray-level signals, and the frames can be classified into different groups according to the LSB. Moreover, in step 204, the offset pattern is applied on the frames, wherein the offset pattern is displayed at the same polarity in the same column of each frame in the same group.

Figure 2B:
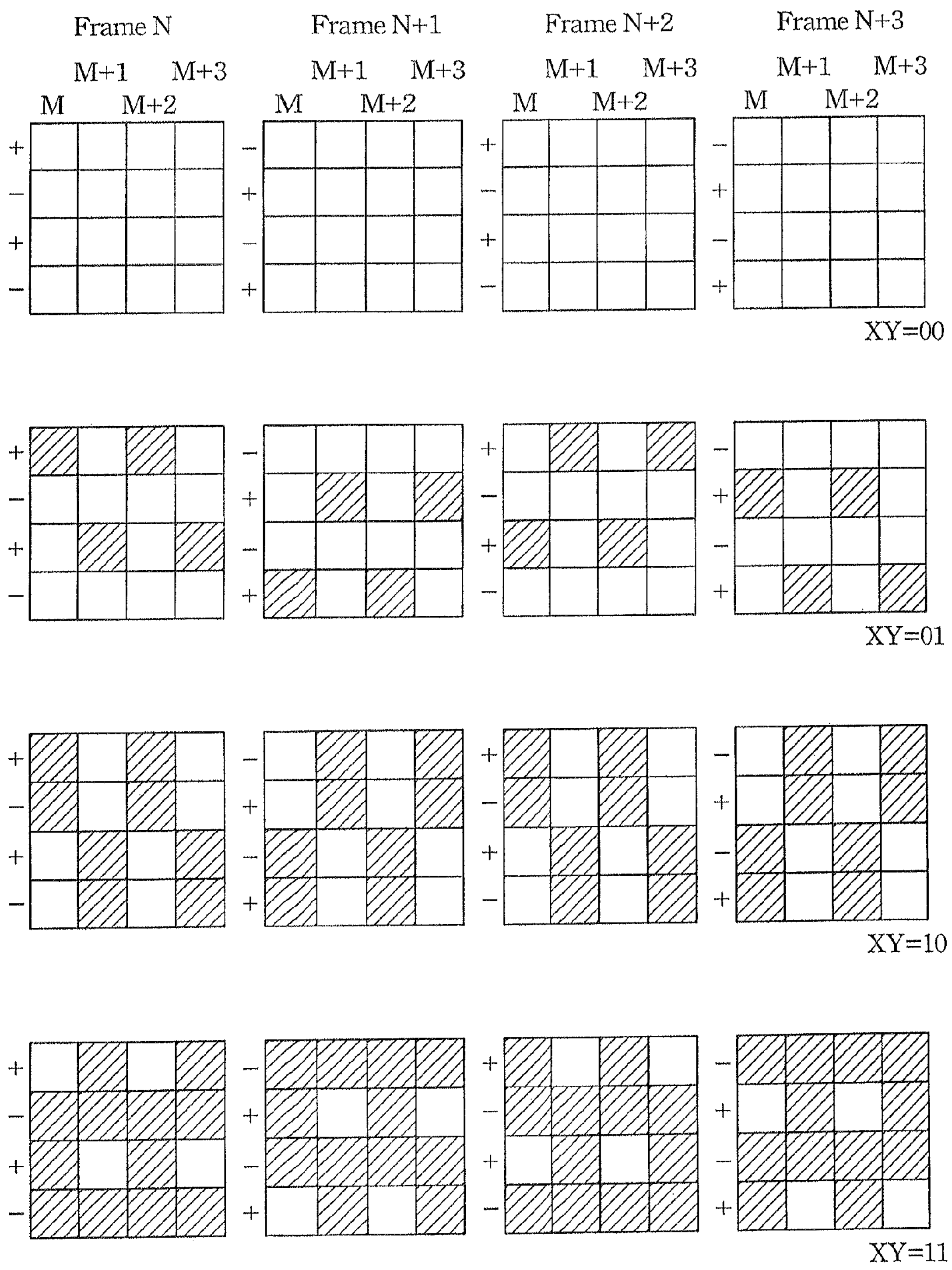
FIG. 2B depicts 2-bit dithering algorithm according to one embodiment of this invention.

In order to describe the embodiment of the present invention, please refer to FIG. 2B. This figure is a 2-bit dithering algorithm according to one embodiment of this invention at line inversion control mode. When the input gray-level signal is 8-bit and the DAC is 6-bit, the 2-bit LSB (least significant bit) of the 8-bit gray-level signal is processed by the dithering algorithm. The 2-bit dithering algorithm generates four by four frames as a unit in spatial dithering and generates four frames as a unit in temporal dithering. Therefore, the 2-bit dithering algorithm generates four by four frames as a unit in spatial dithering and generates four frames as a unit in temporal dithering. Wherein the frames generated based on the 2-bit algorithm are classified into four different groups according to the LSB (XY is 00, 01, 10, and 11). In this embodiment, the polarity inversion of the sequence of frames is controlled at line inversion mode.

In the XY=01 group, the offset pattern is displayed at one pixel in every column of each frame. The offset pattern may display on one polarity pixel at every column of each frame. Moreover, in order to reduce scroll noise and flicker, the offset pattern displayed at every column displays at the same polarity pixel in the frame cycle.

For example, at frame N, column M, the offset pattern is at positive polarity. In addition, at frame N+1, column M, the offset pattern is at positive polarity, at frame N+2, column M, the offset pattern is at positive polarity, and at frame N+3, column M, the offset pattern is at positive polarity too. The scroll noise and the flicker in the line inversion occur due to the possible non-symmetry of the negative polarity voltage and the positive polarity voltage controlled by VCOM. Hence, the offset pattern displayed at each column is displayed at the same polarity pixel in the frame cycle to reduce scroll noise and flicker. That is, the offset pattern always displays at the positive polarity pixel in every column in the same group or displays at the negative polarity pixel in every column of each frame in the same group when the offset pattern is displayed at one pixel in every column of each frame in the same group (XY=01 group).

Moreover, in the XY=10 group, the offset pattern is displayed at two pixels in every column of each frame. Hence, the offset pattern displays at two positive polarity pixels in every column of each frame, or the offset pattern displays at two negative polarity pixels in every column of each frame, or the offset pattern displays at one negative polarity pixel and one positive polarity pixel in every column of each frame in the XY=10 group.

In addition, in the XY=11 group, the offset pattern is displayed at three pixels in every column of each frame. Hence, the offset pattern displays at one negative polarity pixel and two positive polarity pixels in every column of each frame or the offset pattern displays at one positive polarity pixel and two negative polarity pixels in every column of each frame in the XY=11 group.

Furthermore, when the polarity of the sequence of frames is controlled in dot inversion, the offset pattern displays in the every column of each frame has the same polarity position in the same group.

Accordingly, due to the possible non-symmetry of the negative polarity voltage and the positive polarity voltage controlled by VCOM may occur the scroll noise and the flicker in the LCD panel when the dithering function is being executed. Hence, the improved dithering method of the embodiment of this invention keeps the offset pattern display at the same polarity in the same column of each frame in the same group so that the embodiment of the invention can reduce the scroll noise and flicker in the LCD panel.

Although the present invention has been described in considerable detail with reference t certain preferred embodiments thereof, other embodiments are possible. Therefore, their spirit and scope of the appended claims should no be limited to the description of the preferred embodiments container herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A dithering method for displaying an image on an LCD, comprising a digital-to-analog converter (DAC) for:

receiving a plurality of long-bit gray-level signals;

transforming each of the long-bit gray-level signals into a short-bit gray-level signal and obtaining at least one LSB (least significant bit) based on the bit length difference between the long-bit gray-level signal and the short-bit gray-level signal;

generating a sequence of frames by the short-bit gray-level signals, and classifying the frames into different groups according to the LSB; and applying an offset pattern on the frames, wherein the offset pattern is displayed at the same polarity in the same column of each frame in the same group.

2. The method as claimed in claim 1, wherein the polarity inversion of the sequence of frames is line inversion.

3. The method as claimed in claim 2, wherein when the offset pattern is displayed at one pixel in every column of each frame in the same group, the offset pattern always displays at the positive polarity pixel in every column of each frame in the same group.

4. The method as claimed in claim 2, wherein when the offset pattern is displayed at one pixel in every column of each frame in the same group, the offset pattern always displays at the negative polarity pixel in every column of each frame in the same group.

5. The method as claimed in claim 2, wherein when the offset pattern is displayed at two pixels in every column of each frame in the same group, the offset pattern displays at two positive polarity pixels in every column of each frame in the same group.

6. The method as claimed in claim 2, wherein when the offset pattern is displayed at two pixels in every column of each frame in the same group, the offset pattern displays at two negative polarity pixels in every column of each frame in the same group.

7. The method as claimed in claim 2, wherein when the offset pattern is displayed at two pixels in every column of each frame in the same group, the offset pattern displays at one negative polarity pixel and one positive polarity pixel in every column of each frame in the same group.

8. The method as claimed in claim 2, wherein when the offset pattern is displayed at three pixels in every column of each frame in the same group, the offset pattern displays at one negative polarity pixel and two positive polarity pixels in every column of each frame in the same group.

9. The method as claimed in claim 2, wherein when the offset pattern is displayed at three pixels in every column of each frame in the same group, the offset pattern displays at one positive polarity pixel and two negative polarity pixels in every column of each frame in the same group.

10. The method as claimed in claim 1, wherein the sequence of frames is dot inversion.

11. The method as claimed in claim 10, wherein the offset pattern displays in every column of each frame the same polarity position in the same group.

* * * * *